United States Patent
Porter

(10) Patent No.: US 12,285,068 B2
(45) Date of Patent: Apr. 29, 2025

(54) AUGMENTED REALITY DISPLAY HAT MOUNT

(71) Applicant: Vuzix Corporation, West Henrietta, NY (US)

(72) Inventor: Tyler W. Porter, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 210 days.

(21) Appl. No.: 17/630,832

(22) PCT Filed: Jul. 30, 2020

(86) PCT No.: PCT/US2020/044352
§ 371 (c)(1),
(2) Date: Jan. 27, 2022

(87) PCT Pub. No.: WO2021/022092
PCT Pub. Date: Feb. 4, 2021

(65) Prior Publication Data
US 2022/0273062 A1    Sep. 1, 2022

Related U.S. Application Data

(60) Provisional application No. 62/881,721, filed on Aug. 1, 2019, provisional application No. 62/880,632, filed on Jul. 30, 2019.

(51) Int. Cl.
*A42B 1/24* (2021.01)
*G02B 27/01* (2006.01)

(52) U.S. Cl.
CPC ............ *A42B 1/24* (2013.01); *G02B 27/0176* (2013.01)

(58) Field of Classification Search
CPC .... A42B 1/24; A45F 5/02; G02C 3/02; Y10T 24/1394; F16B 2/20
USPC ...... 248/231.8, 339, 682, 689, 205.1, 220.1, 248/222.51, 222.52, 227.1, 306, 307, 314; 224/181, 269
See application file for complete search history.

(56) References Cited

U.S. PATENT DOCUMENTS

| | | | | |
|---|---|---|---|---|
| 1,618,384 A | * | 2/1927 | Morris | A44B 9/00 24/570 |
| 4,764,989 A | | 8/1988 | Bourgeois | |
| 5,052,054 A | * | 10/1991 | Birum | A42C 5/02 2/10 |
| 5,066,154 A | * | 11/1991 | Renaud | A42B 3/04 24/3.12 |

(Continued)

OTHER PUBLICATIONS

International Search report and Written Opinion, International Patent Application No. PCT/US2020/044352, dated Oct. 20, 2020.

*Primary Examiner* — F Griffin Hall
(74) *Attorney, Agent, or Firm* — Harter Secrest & Emery LLP; Jacob D. Merrill, Esq.

(57) ABSTRACT

An instrument holder for headwear, the instrument holder including a first hanger and a second hanger coupled with the first hanger. A center finger coupled with and located between the first and second hangers; and an instrument mount coupled with the center finger. Wherein the first and second hangers are operable to bias relative to the center finger whereby a portion of a cap is operable to be positioned between the first and second hangers and the center finger.

17 Claims, 13 Drawing Sheets

(56) References Cited

U.S. PATENT DOCUMENTS

| | | | | |
|---|---|---|---|---|
| 5,113,554 | A * | 5/1992 | Gallo | A47G 25/485 |
| | | | | 24/562 |
| 6,892,393 | B1 * | 5/2005 | Provost | G02C 3/02 |
| | | | | 2/10 |
| 7,216,972 | B1 * | 5/2007 | Gelfuso | G02C 3/02 |
| | | | | 351/158 |
| 9,131,740 | B2 * | 9/2015 | Renaud | A42B 3/0406 |
| D752,342 | S * | 3/2016 | Woods | D3/219 |
| 10,048,509 | B2 * | 8/2018 | Repko | G02C 7/10 |
| 2002/0184738 | A1 * | 12/2002 | Tsai | A42B 1/0182 |
| | | | | 24/3.12 |
| 2005/0150084 | A1 * | 7/2005 | Dreyer | B42F 1/06 |
| | | | | 24/67.9 |
| 2010/0058972 | A1 | 3/2010 | Kinvi | |
| 2011/0247120 | A1 * | 10/2011 | Knoedler | A42B 1/247 |
| | | | | 2/10 |
| 2012/0317706 | A1 * | 12/2012 | Lebel | A42B 3/04 |
| | | | | 2/422 |
| 2016/0292918 | A1 | 10/2016 | Cummings | |
| 2017/0105461 | A1 | 4/2017 | Hancock et al. | |
| 2018/0124366 | A1 | 5/2018 | Kusuda | |
| 2018/0180895 | A1 * | 6/2018 | Pombo | G02B 27/0176 |

* cited by examiner

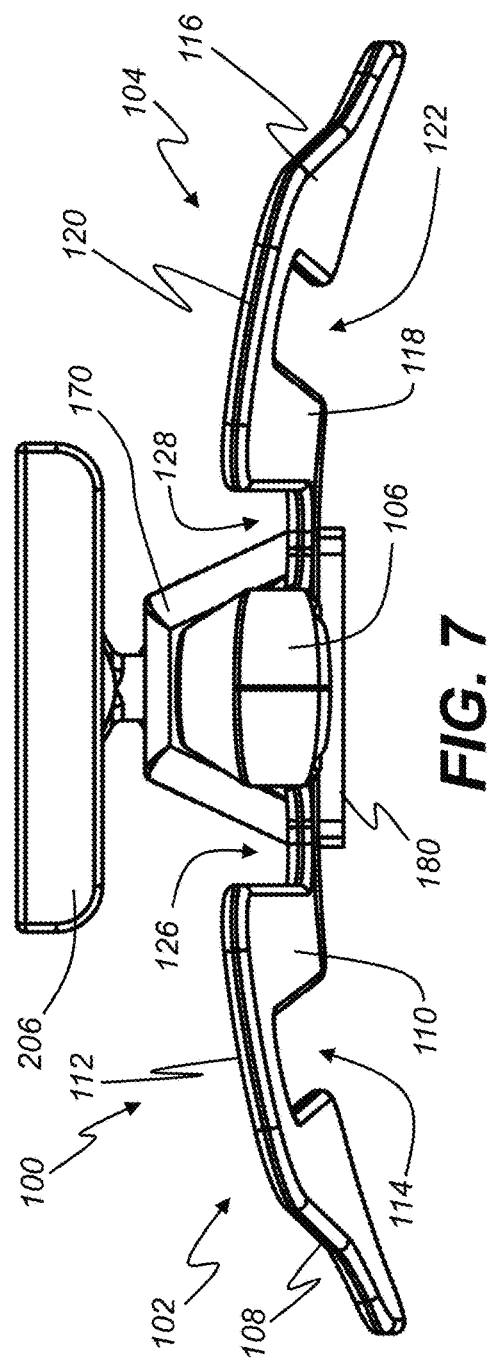
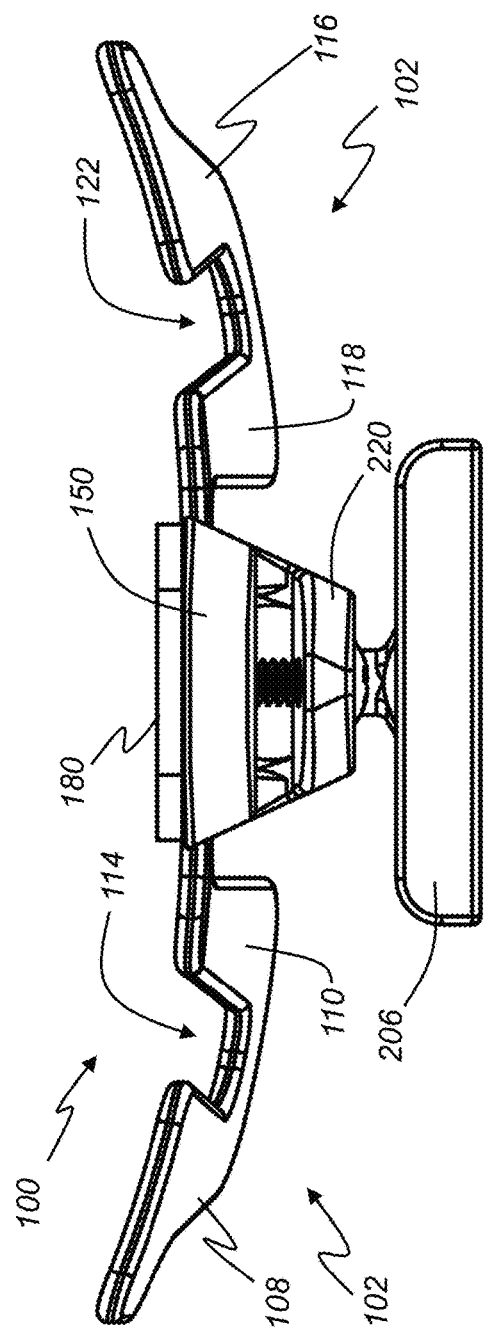
FIG. 7
FIG. 8

AUGMENTED REALITY DISPLAY HAT MOUNT

TECHNICAL FIELD

The present disclosure relates generally to an apparatus operable to releasably attach an instrument or apparatus to a hat or cap, and more specifically to a mount operable to connect a device (e.g., a near-eye display device) to a hat or cap.

BACKGROUND

Conventional devices for attaching instruments (e.g., writing implements) to a safety-helmet/hard-hat are known in the art. For example, U.S. Pat. No. 3,983,602 issued to Barry discloses an implement holder for a safety helmet. A holder is formed of molded plastic having a first clamp for releasably engaging an edge portion of the safety helmet to detachably mount the holder thereon, and a second clamp projecting outwardly from one jaw of the first clamp for detachably receiving and holding a slender object such as a pencil or a pen.

U.S. Pat. No. 5,066,154 issued to Renaud discloses a pencil support for a security hat. The support includes a generally flat member which is formed of a slight curvature enabling it to rest against the surface of the security hat. The generally flat member comprises a curved tongue projecting therefrom to support and hold a pencil or elongated object. The security hat of Renaud includes a sheath provided on the two sides thereof, and the support includes a rectangular strip located in the sheath. The rectangular strip and sheath secure the support to the bottom edge of the security hat.

Thus, the provision of a hat mount operable to be affixed to a generally soft cap (e.g., a common baseball-style cap) to support an instrument and/or apparatus and having increased efficacy and manufacturing efficiencies has not been contemplated. Other advantages of the presently disclosed subject matter will be rendered evident to those skilled in the art

SUMMARY

In a first exemplary embodiment, the present disclosure provides for an
instrument holder for headwear, the instrument holder including a first hanger and a second hanger coupled with the first hanger. The instrument holder also includes a center finger coupled with and located between the first and second hangers; and an instrument mount coupled with the center finger. The first and second hangers are operable to bias relative to the center finger whereby a portion of a cap is operable to be positioned between the first and second hangers and the center finger.

In a second exemplary embodiment, the present disclosure provides for a hat mounting system including a hat, a first hat mount coupled with the hat, and a second hat mount coupled with the hat. The first and second hat mounts each include a first hanger, a second hanger coupled with the first hanger, a center finger coupled with and located between the first and second hangers; and an instrument mount coupled with the center finger. The first and second hangers are operable to bias relative to the center finger whereby a portion of the hat is operable to be positioned between the first and second hangers and the center finger.

BRIEF DESCRIPTION OF THE DRAWINGS

The accompanying drawings are incorporated herein as part of the specification. The drawings described herein show embodiments of the present disclosure and are illustrative of selected principles and teachings of the presently disclosed subject matter. However, the drawings do not disclose all possible implementations of the presently disclosed subject matter and are not intended to limit the scope of the present disclosure in any way.

FIG. 7 is a top view of the of the hat mount and instrument mount according to FIG. 4.

FIG. 8 is a bottom view of the of the hat mount and instrument mount according to FIG. 4.

DETAILED DESCRIPTION

Figure 1:
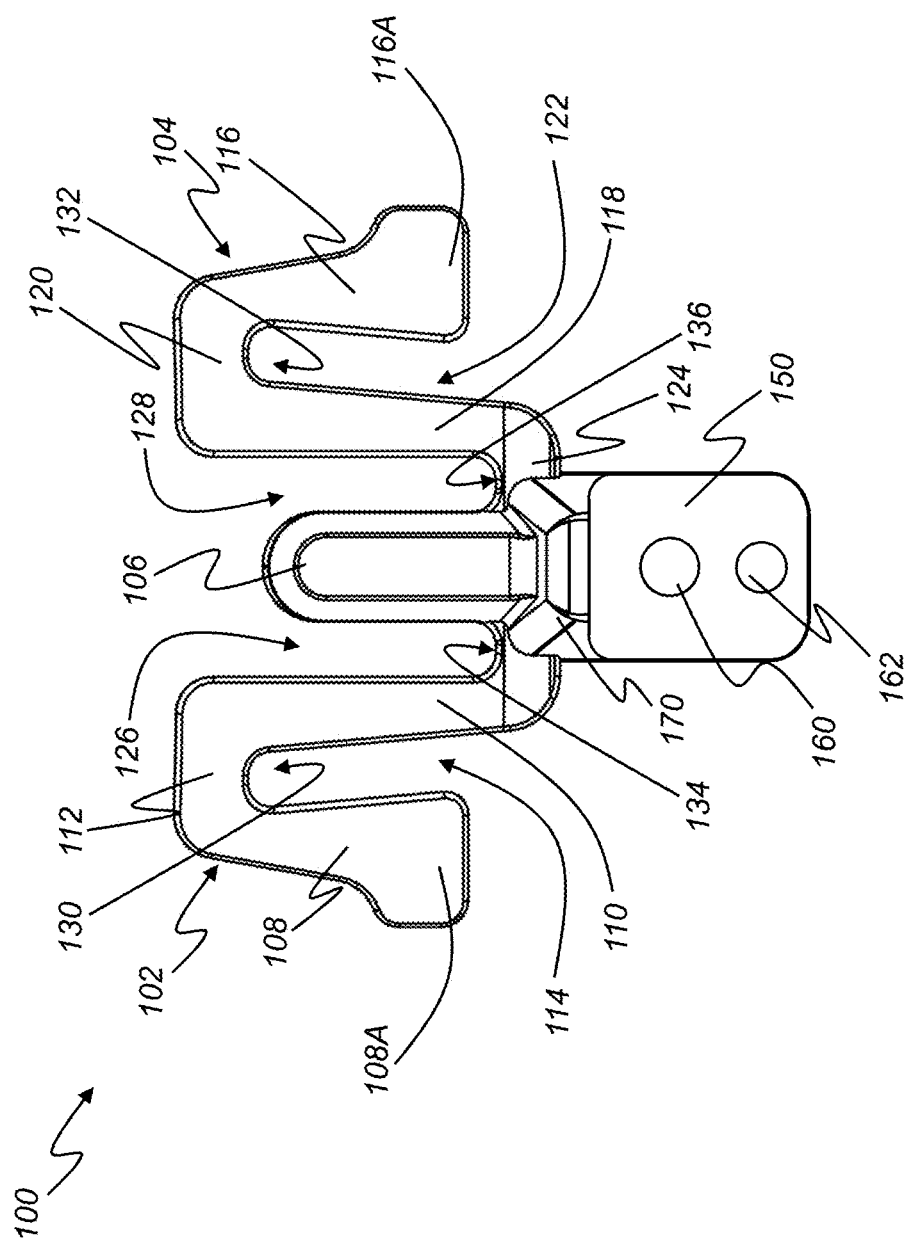
FIG. 1 is a front view of an hat mount according to an embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, in an embodiment, a hat mount 100 includes a first hanger 102, a second hanger 104, and a middle finger 106. The first hanger 102 includes a first finger 108 and a second finger 110 connected via a first bridge 112. The first and second fingers 108, 110 and the first bridge 112 define a first gap 114. In an embodiment, as illustrated in FIG. 1, the first gap 114 is defined by the first and second fingers 108, 110 and the first bridge 112 to form a generally upside-down U-shaped geometry. In another embodiment, the first gap 114 defines a generally upside-down V-shaped geometry. In still another embodiment, the first gap 114 defines a generally C-shaped geometry.

The second hanger 104 includes a third finger 116 and a fourth finger 118 connected via a second bridge 120. The third and fourth fingers 116, 118 and the second bridge 120 define a second gap 122. In an embodiment, as illustrated in FIG. 1, the second gap 122 defines a generally upside-down U-shaped geometry. In another embodiment, the second gap 122 defines a generally upside-down V-shaped geometry. In still another embodiment, the second gap 122 defines a generally C-shaped geometry.

The second finger 110 is coupled with the middle finger 106 and the fourth finger 118 via a third bridge 124. The first, second, and third bridges 112, 120, 124 are portions of the hat mount 100 which couple one or more other portions of the hat mount 100. Referring now to FIGS. 1-3 and 5, the hat mount 100 also includes a plate 150 coupled with the third bridge 124. The plate 150 includes a cover stop 170. The first finger 108 and the third finger 116 extend downwardly from the first and second bridges 112, 120 respectively when the hat mount 100 is oriented in a generally upright position. In an embodiment, the first and third fingers 108, 116 include a lower portion 108A, 116A increasing in width. The lower portions 108A, 116A provide increased surface area operable to increase the wearer's comfort and increased surface area operable to decrease movement relative to an item of headwear.

Figure 2:
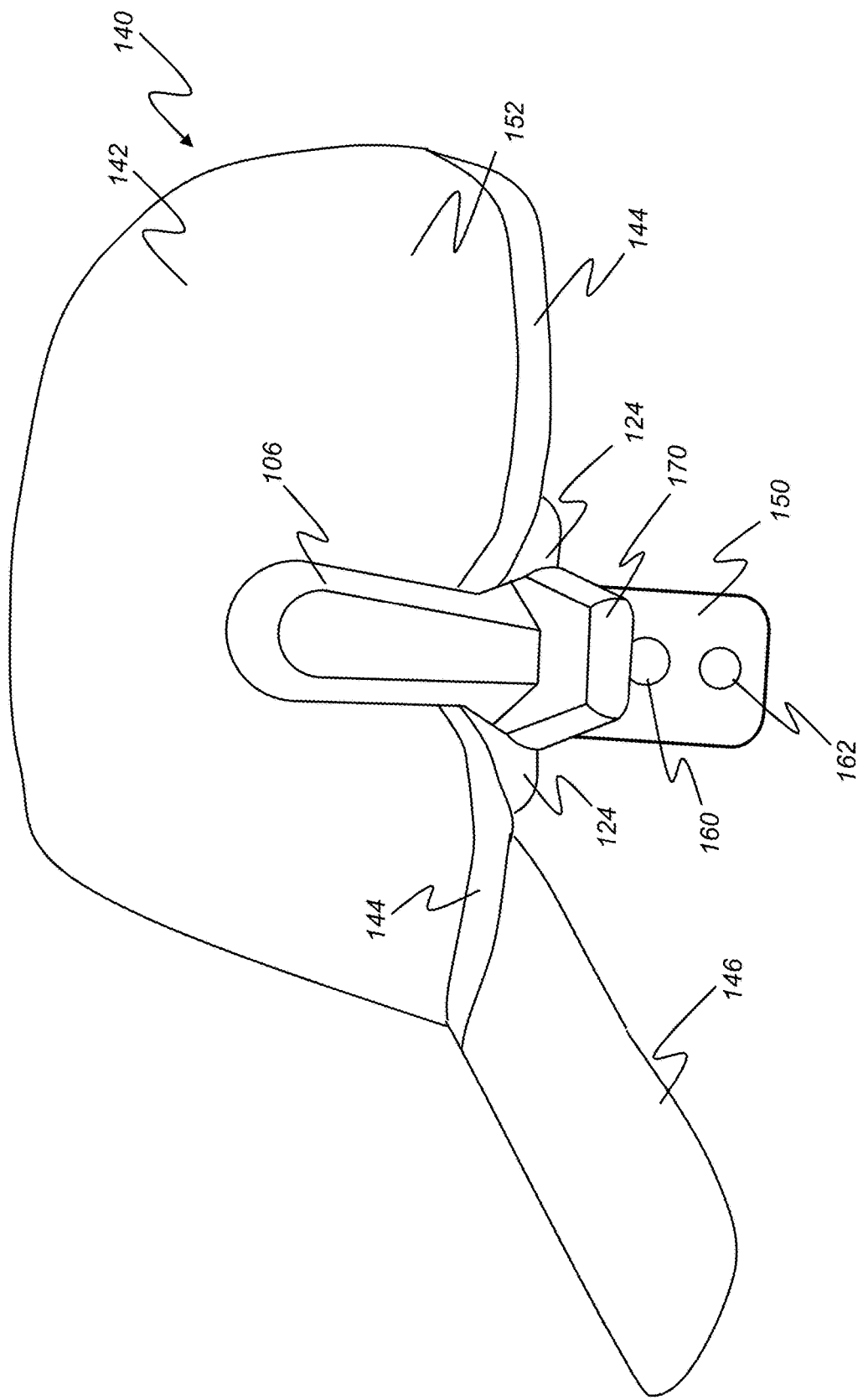
FIG. 2 is a front view of the hat mount according to FIG. 1 attached to a cap.
Figure 3:
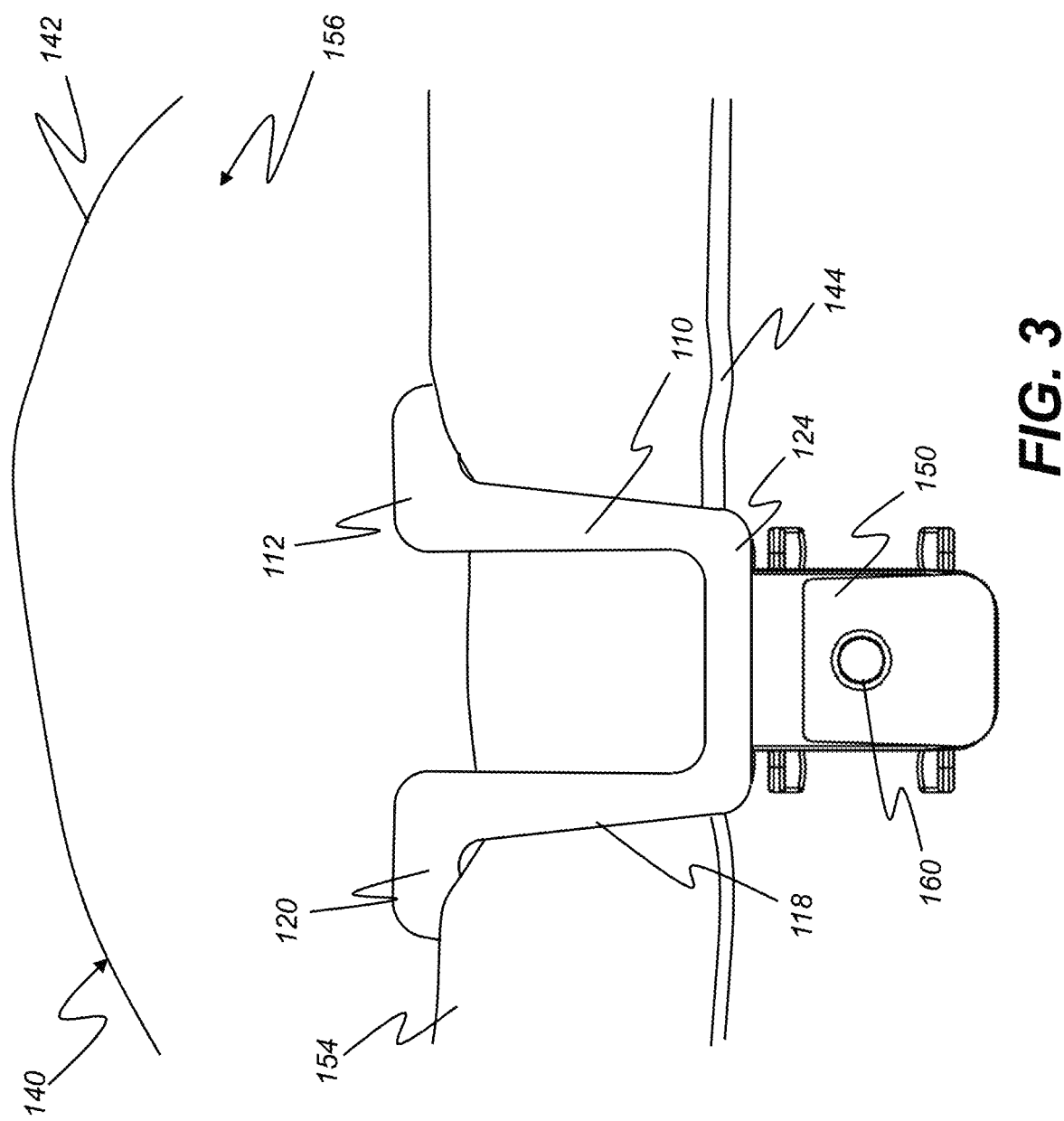
FIG. 3 is a back view of the hat mount according to FIG. 2 attached to the cap.

The second finger 110, the middle finger 106, and the third bridge 124 define a third gap 126. The fourth finger 118, the middle finger 106, and the third bridge 124 define a fourth gap 128. The first gap 114 defines a first vertical stop surface 130, the second gap 122 defines a second vertical stop surface 132, the third gap 126 defines a third vertical stop surface 134, and the fourth gap 128 defines a fourth vertical stop surface 136. As illustrated in FIGS. 2-3, in an embodiment, the hat mount 100 is operable to be secured/affixed to a cap 140. The cap 140 includes a crown 142 having a rim 144 defining a head opening. A visor 146 is connected with the crown 142. In an embodiment, the cap 140 is baseball style cap (e.g., a six-panel crown coupled with a visor). In another embodiment, the cap 140 is a hat or cap not including a visor, such as, but not limited to, a knit cap (e.g., beanie), beret, or ascot cap.

With continued reference to FIGS. 2 and 3, in an embodiment, the hat mount 100 is secured to the cap 140 such that the cap rim 144 is woven through the third and fourth gaps 126, 128. When the hat mount 100 is secured to the cap 140 the middle finger 106 is located adjacent to an exterior surface of the cap crown 142, and the first and second hangers 102, 104 are located adjacent to an interior surface of the cap crown 142. In an embodiment, the bottom periphery of the cap rim 144 abuts the third and fourth vertical stop surfaces 134, 136 when the hat mount 100 and the cap 140 are coupled.

Figure 9:
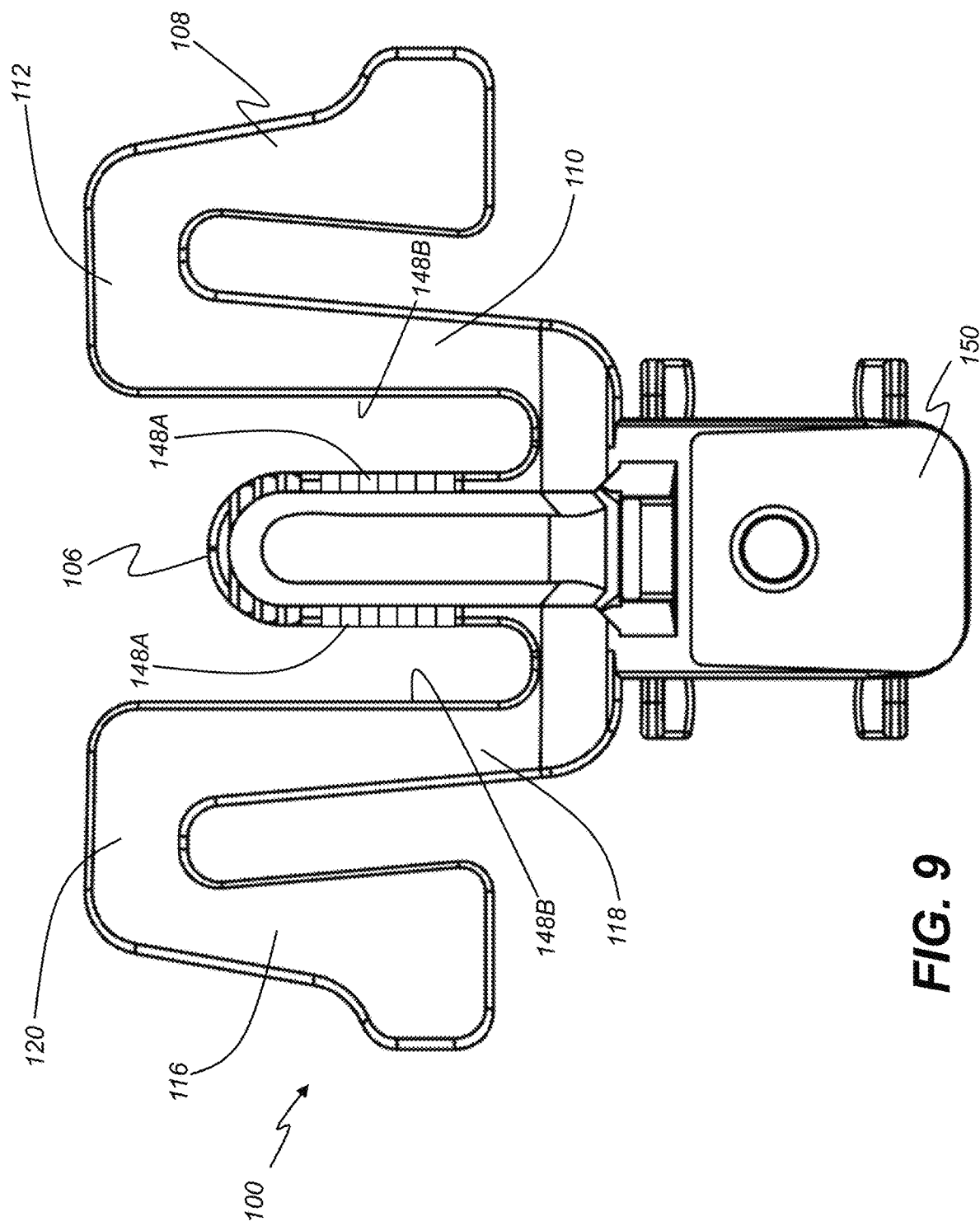
FIG. 9 is a back view of the hat mount and instrument mount according to FIG. 4.
Figure 10:
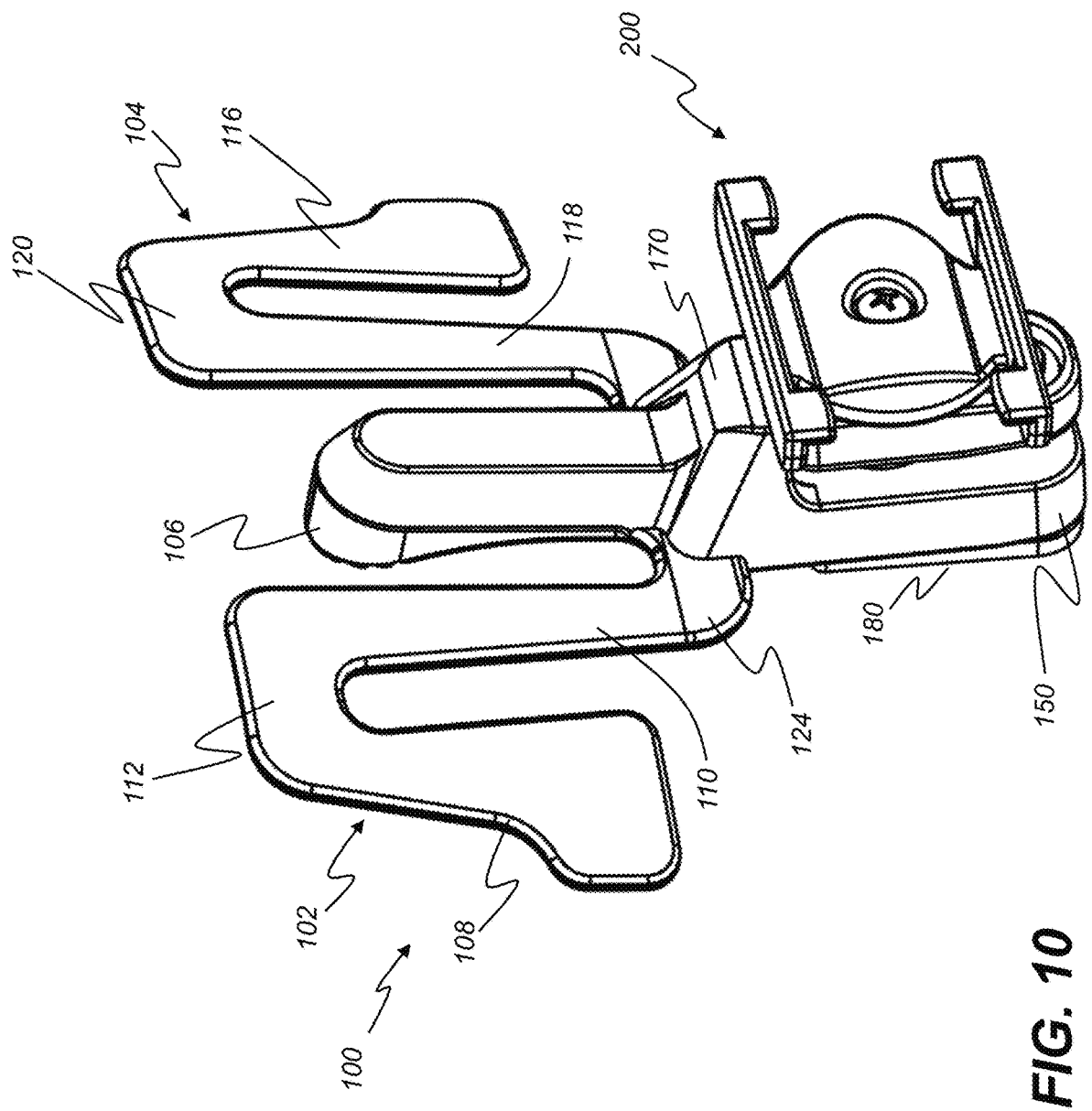
FIG. 10 is a perspective view of the hat mount and instrument mount according to FIG. 4.

In an embodiment, as illustrated in FIG. 9, one or more surfaces of the first finger 108, the second finger 110, the middle finger 106, the third finger 116, the fourth finger 118, the first bridge 112, and the second bridge 120, is barbed, ribbed, or ridged. For example, the inward facing surface of the middle finger 106 may include barbs 148A, and the outward facing surface of the second and fourth fingers 110, 118 may include barbs 148B. In another embodiment, one or more surfaces of the first finger 108, the second finger 110, the middle finger 106, the third finger 116, the fourth finger 118, the first bridge 112, and the second bridge 120, is coated with an adhesive. In another embodiment, one or more surfaces of the first finger 108, the second finger 110, the middle finger 106, the third finger 116, the fourth finger 118, the first bridge 112, and the second bridge 120, is coupled with a low durometer material, i.e., a resilient/elastic material such as, but not limited to, an open-cell foam. The barbs 148, the adhesive, and the low durometer material are operable to facilitate maintenance of a relative position of the hat mount 100 to the cap 140.

Figure 11:
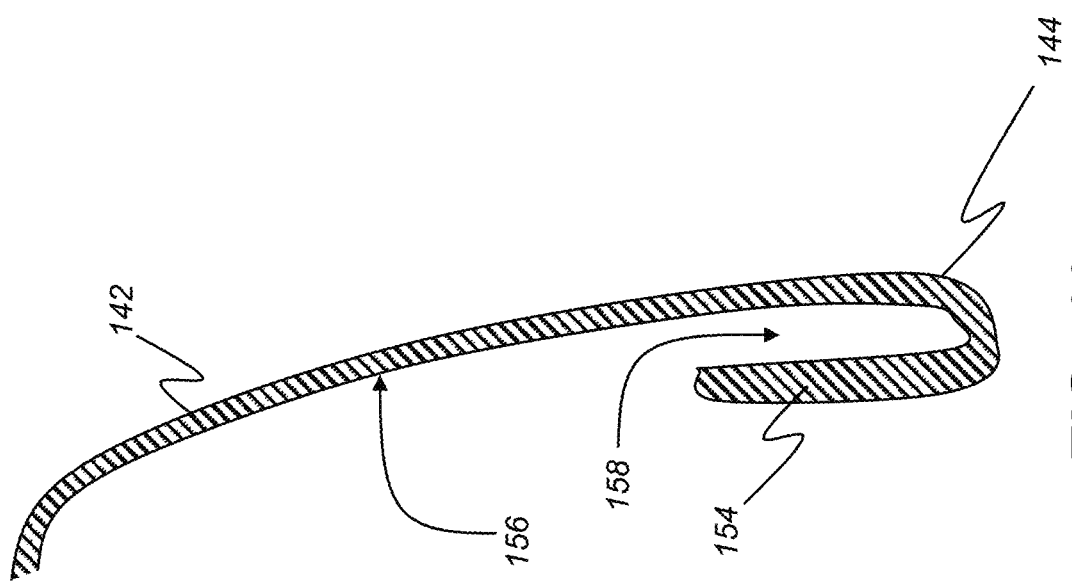
FIG. 11 is a cross-sectional view of a portion of the cap according to FIG. 2.

In an embodiment, as illustrated in FIGS. 3 and 11, the cap 140 includes a sweatband 154 located about the interior of the cap rim 144. The cap sweatband 154 and an inside surface 156 of the crown 142 and/or the rim 144 define a pocket 158. Persons skilled in the art will recognize that the crown 142 and the sweatband 154 may be manufactured unitary and integral or may be produced of two or more materials coupled together (e.g., via sewing or adhesive). The first and third fingers 108, 116 may be positioned between the cap sweatband 154 and the inside surface 156 of the crown 142 inside the pocket 158. When the hat mount 100 is secured to the cap 140 the sweatband 154 is woven into/located in the first and second gaps 114, 122. In this way, the hat mount 100 is secured to the cap 140 by a pressure exerted by the first and second hangers 102, 104 and the middle finger 106 against the cap 140, and by a position of the first and third fingers 108, 116 in the pocket 158 (making it impossible for the hat mount 100 to slide down and off of the cap 140).

In an embodiment, the hat mount 100 is unitary and integral and composed of a single material type, not including the aforementioned adhesive coatings and low durometer material. In another embodiment, the hat mount 100 is composed of at least two different materials. The first and second fingers 108, 110, the first bridge 112, the third and fourth fingers 116, 118, and the second bridge 120 may comprise a semi-rigid resilient material that enables the hat mount 100 to at least partially conform to the curvature of the wearer's head. As illustrated in FIGS. 5-8, 10 and 13, in an embodiment, the hat mount 100 includes a pad 180 coupled with the plate 150. When the hat mount 100 is coupled with the cap 140, the pad 180 at least partially abuts a wearer's head. The pad 180 may comprise a resilient material operable to at least partially conform to the wearer's head. In an embodiment, the pad 180 may comprise a polymeric foam.

Figure 5:
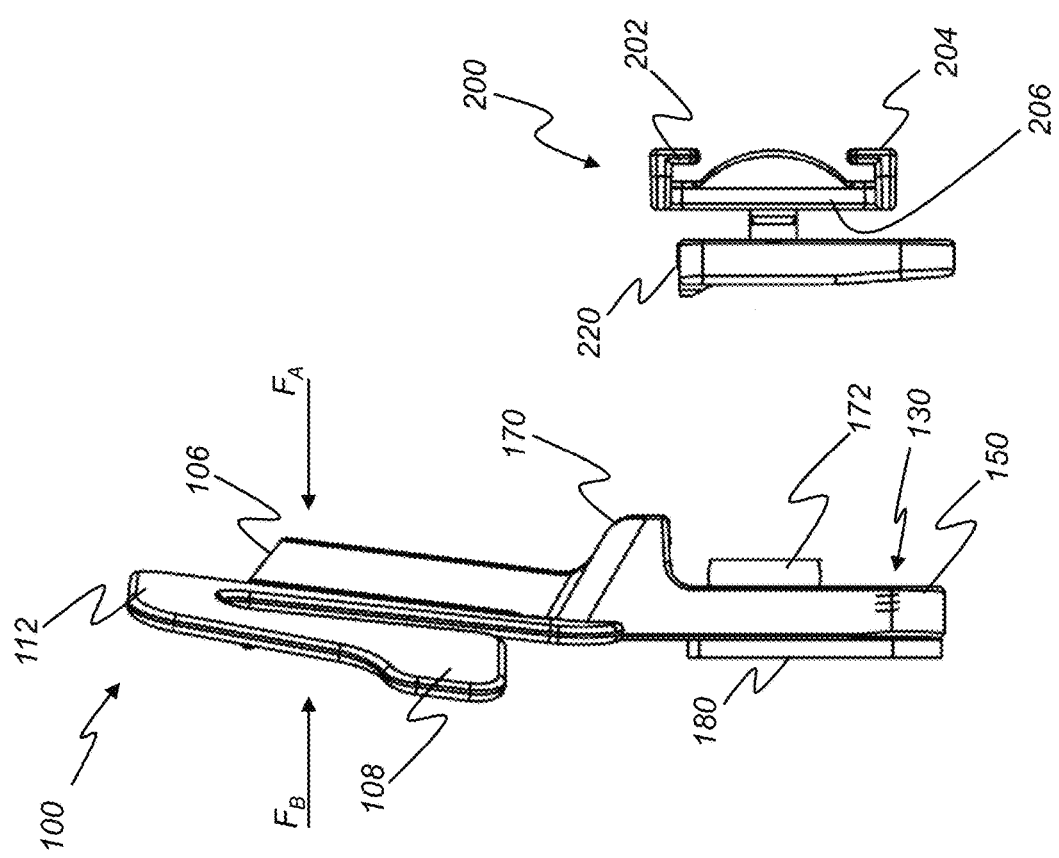
FIG. 5 is a partially exploded side view of the hat mount and instrument mount according to FIG. 4.

Referring now to FIG. 5, in an embodiment, at least a portion of the first hanger 102, the second hanger 104, the middle finger 106, and the third bridge 124 comprises a material and geometry operable to exert a force FA in a first direction and a force FB in a second direction generally towards the first direction when the hat mount 100 and the cap 140 are coupled together. The first and second hangers 102, 104 may be operable to bias relative to the middle finger 106. Additionally, the first finger 108 may be operable to bias relative to the second finger 110 and the third finger 116 may be operable to bias relative to the fourth finger 118, whereby the first and third fingers 108, 116 may be located in the cap pocket 158 and the second and fourth fingers 110, 118 may be located adjacent a radially inward surface of the sweatband 154.

Referring now to FIGS. 1-3, 5, and 6, in an embodiment, the hat mount 100 further comprises a first aperture 160 in the plate 150. The first aperture 160 may be a through hole disposed through first and second opposing surfaces of the plate 150. In an embodiment, the first aperture 160 is threaded for accepting a threaded fastener. The hat mount plate 150 may also include a second aperture 162. The second aperture 162 may be a through hole disposed through first and second opposing surfaces of the plate 150. The second aperture 162 may be threaded for accepting a threaded fastener 230 (see FIG. 6).

Figures 4, 12:
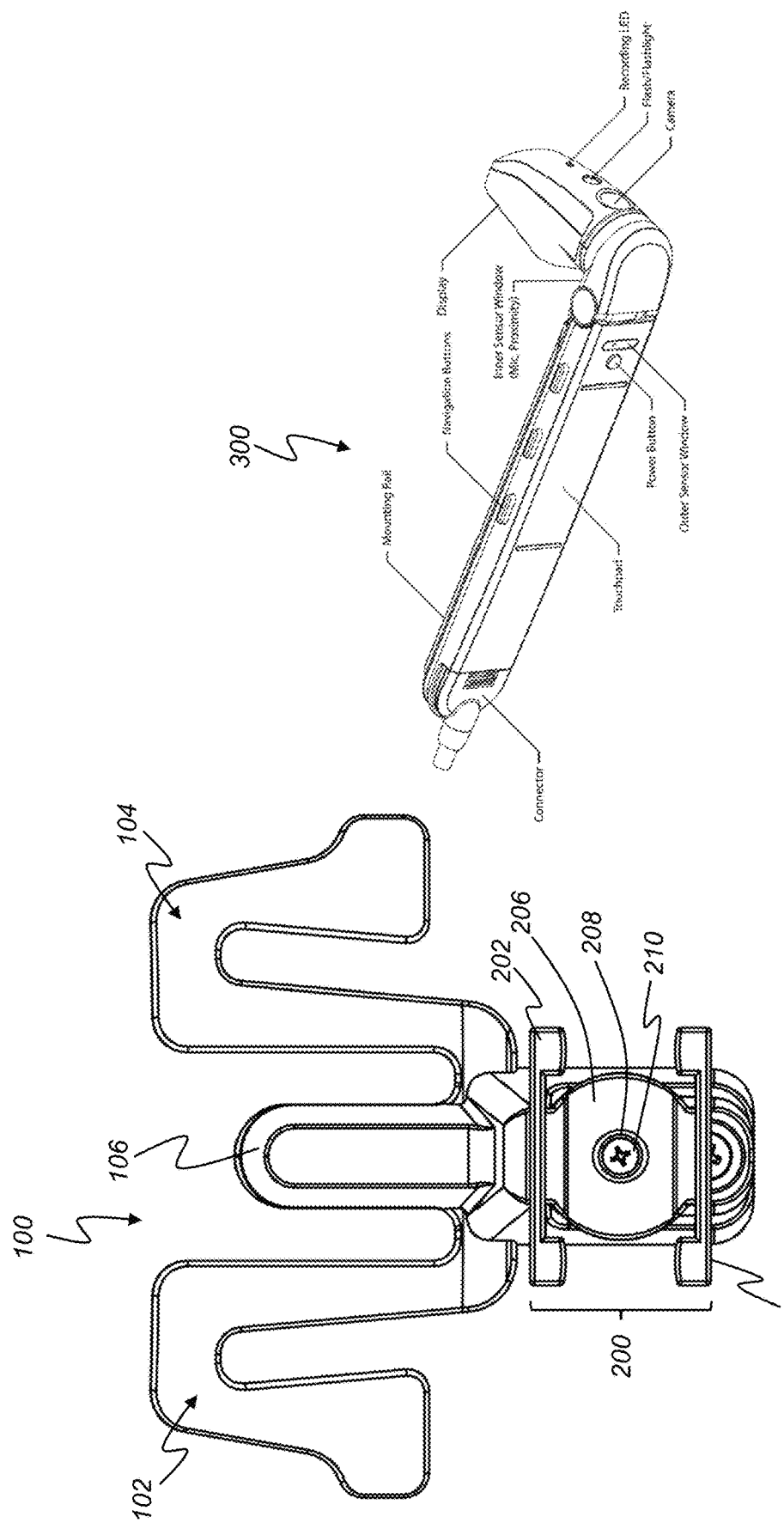
FIG. 4 is a front view of a hat mount and an instrument mount coupled therewith according to an embodiment of the presently disclosed subject matter.
FIG. 12 is a perspective view of an instrument according to an embodiment of the presently disclosed subject matter.

As illustrated in FIG. 4, in an embodiment, the hat mount 100 may include an instrument mount 200. The instrument mount 200 includes a plate 206 having a hole 208 through which a mechanical fastener 210 is used to fasten the instrument mount 200 to the hat mount plate 150. The instrument mount plate 206 includes an upper rail 202 and a lower rail 204 located thereon. The upper and lower rails 202, 204 are operable to attach a near-eye display device 300 (see FIG. 12) to the hat mount 100. The near-eye display device 300 includes a corresponding mounting rail operable to selectively and slidably connect with the upper and lower rails 202, 204 of the instrument mount 200. The hat mount 100 facilitates location of a display of the near-eye display device 300 within a field-of-view of a wearer of the cap 140. Upper rail 202 and lower rail 204 may be adapted in shape to the particular instrument being attached to the cap 140 via the hat mount 100. Therefore, persons skilled in the art will recognize that instruments other than the near-eye display device 300 may be utilized with the hat mount 100.

Figure 13:
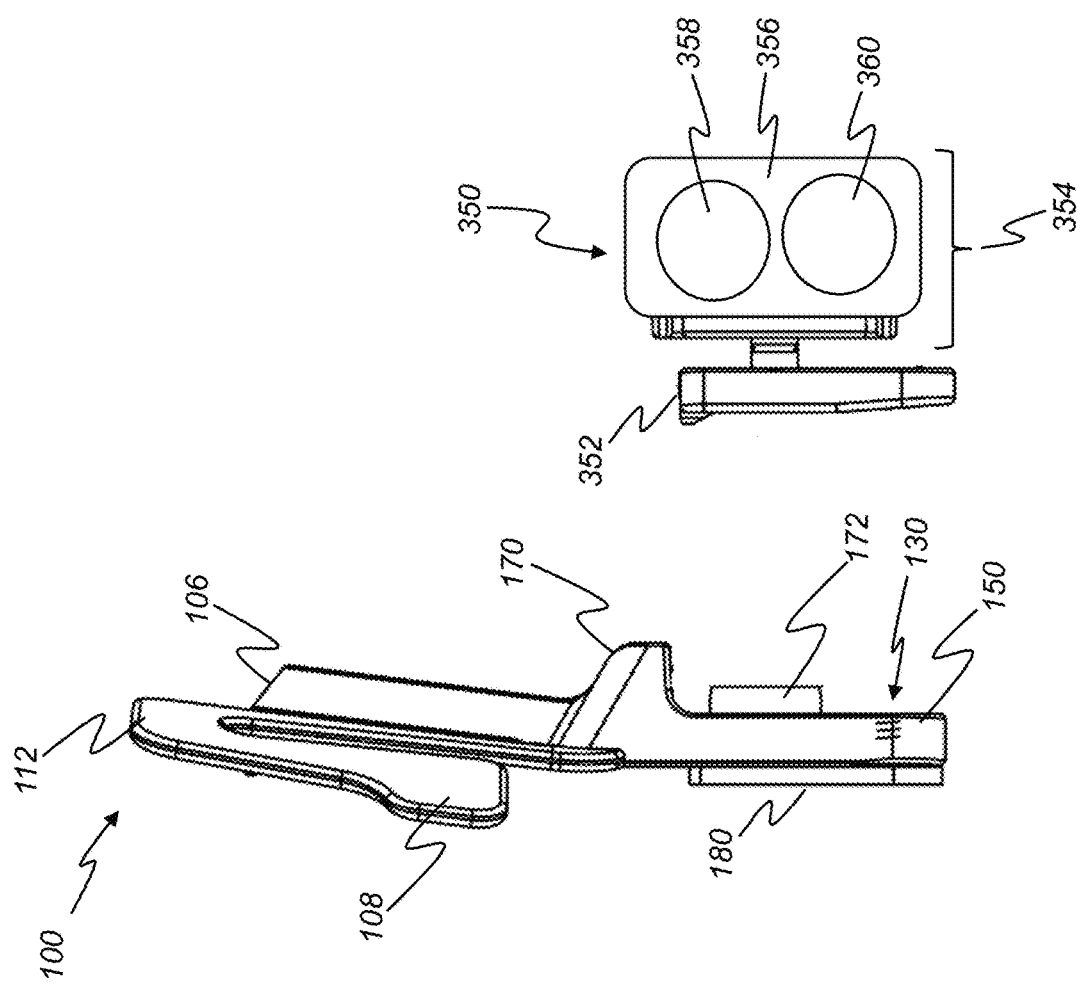
FIG. 13 is a partially exploded side view of the hat mount and an instrument mount according to an embodiment of the presently disclosed subject matter.

In an embodiment, as illustrated in FIG. 13, an instrument mount 350 may be utilized with the hat mount 100. The instrument mount 350 includes a backing plate 352 operable to be coupled with the hat mount 100 via plate 150. The instrument mount 350 also includes an instrument holder 354 having a block 356 through which a first instrument aperture 358 and a second instrument aperture 360 are located. A first instrument may be releasably attached/coupled with the instrument mount 350 by positioning a portion of the first instrument (or a portion of an element coupled therewith) at least partially through the first instrument aperture 358. Similarly, a second instrument may be releasably attached/coupled with the instrument mount 350 by positioning a portion of the second instrument (or a portion of an element coupled therewith) at least partially through the second instrument aperture 360. The first and second instruments may be coupled with the instrument mount 350 simultaneously.

Figure 6:
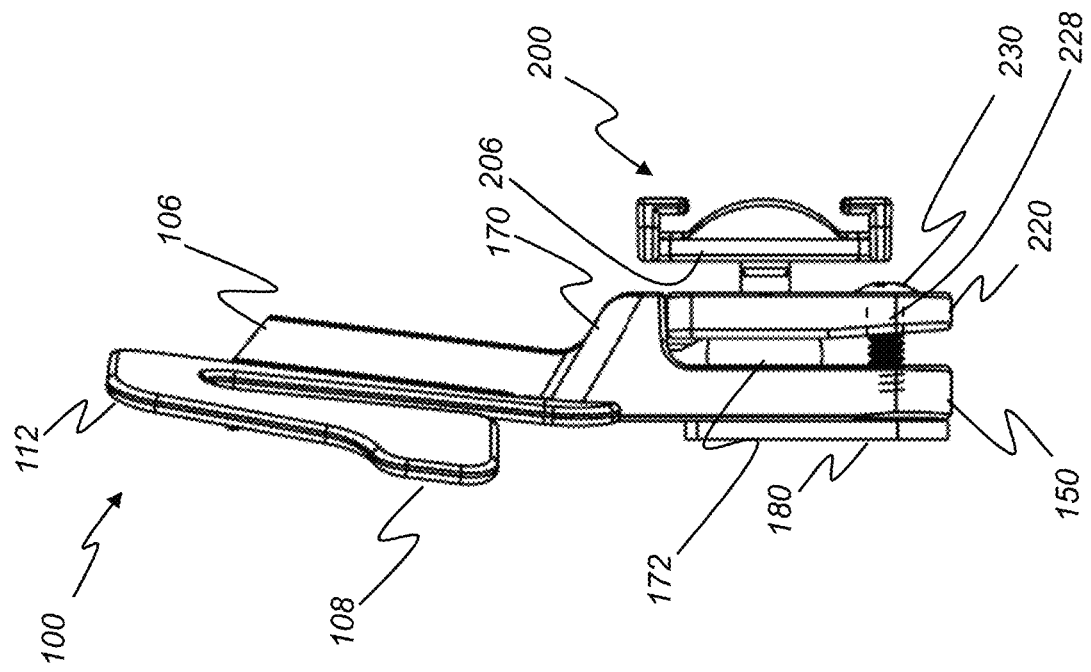
FIG. 6 is a side view of the hat mount and instrument mount according to FIG. 4.

Referring now to FIGS. 5 and 6, in an embodiment, the hat mount plate 150 includes a cover stop 170. The cover stop 170 may comprise a protrusion or lip located adjacent to the middle finger 106. The cover stop 170 is operable to prevent rotation of the instrument mount 200 and therefore undesired rotation of an attached instrument (e.g., near-eye display device 300). Additionally, the cover stop 170 may be utilized to align the instrument mount 200.

The instrument mount 200 may also include a backing plate 220 having an aperture 228 located therethrough. In an embodiment, the threaded fastener 230 is positioned through the aperture 228 and engaged with the threads of the second aperture 162, thereby coupling the instrument mount 200 with the hat mount 100. The second aperture 162, the aperture 228, and the threaded fastener 230 may be used for alignment and/or positioning of the instrument mount 200 relative to the hat mount 100. In an embodiment, as illustrated in FIGS. 5-6, a spacer 172 may be coupled with the hat mount plate 150. The spacer 172 is operable to locate the instrument mount 200.

It is to be understood that the instrument mount 200 may take on other shapes and have other components as needed to fasten an instrument to the hat mount 100. It is to be further understood that some instruments may have a mount attached thereto or may have mounts integrated therewith, in which case a separate instrument mount is not required and the instrument is attached directly to the hat mount 100.

In one embodiment, the instrument to be attached is the near-eye display device 300. In another embodiment, the instrument may be one or more light sources such as, but not limited to, a torch or flashlight. In another embodiment, the instrument may be one or more cameras. In yet another embodiment, the instrument may be one or more microphones.

Figure 14:
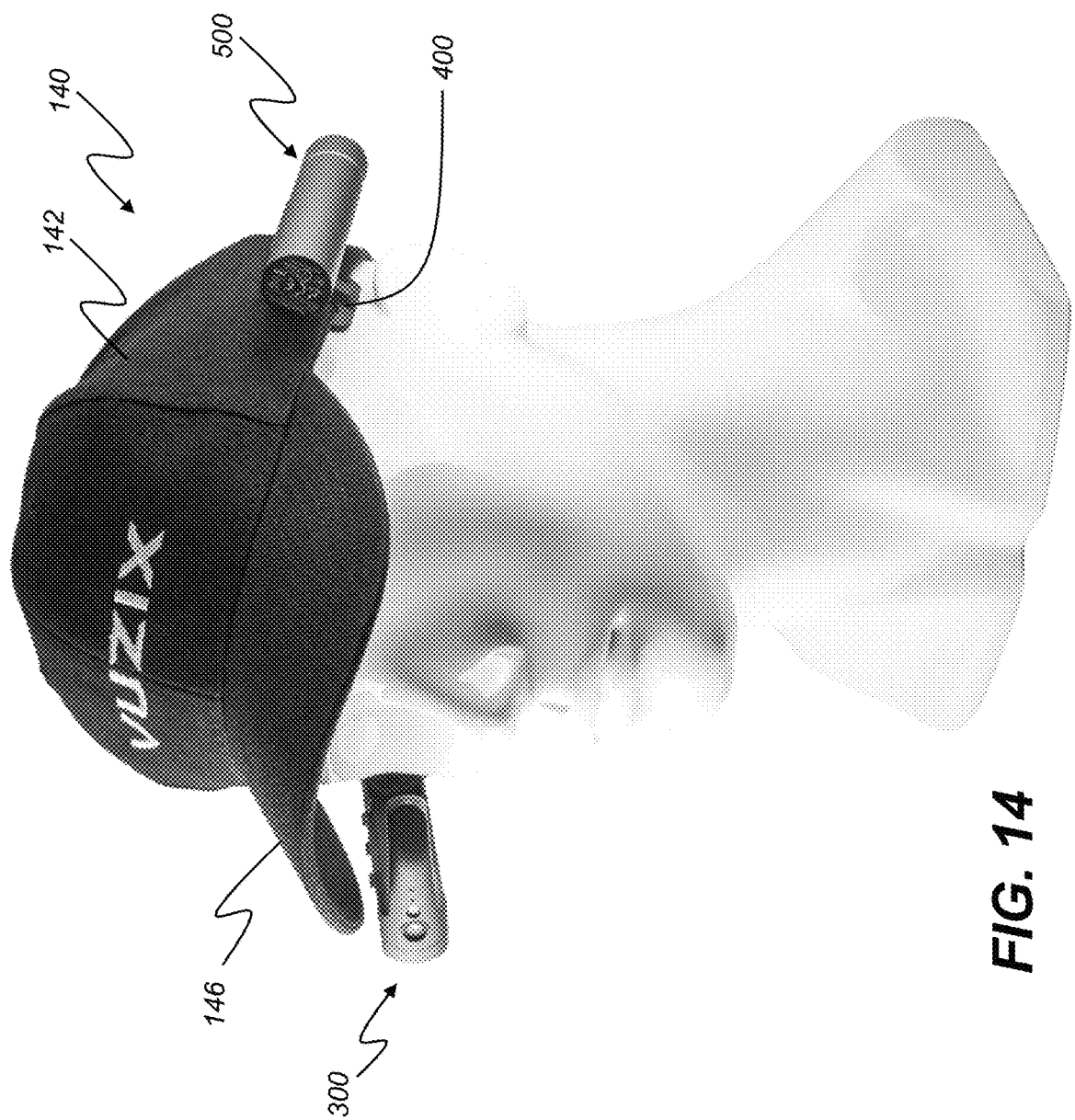
FIG. 14 a perspective view of a hat mounting system having first and second hat mounts according to an embodiment of the presently disclosed subject matter.

It is to be understood that the terms "cap" and "hat" as utilized herein are interchangeable. It is to be understood that more than one hat mount 100 may be attached to a hat at any one time. In an embodiment, as shown in FIG. 14, a first hat mount 100 is attached to the right side of the cap 140 and a second hat mount 400 is attached to the left side of the same cap 140.

Figure 15:
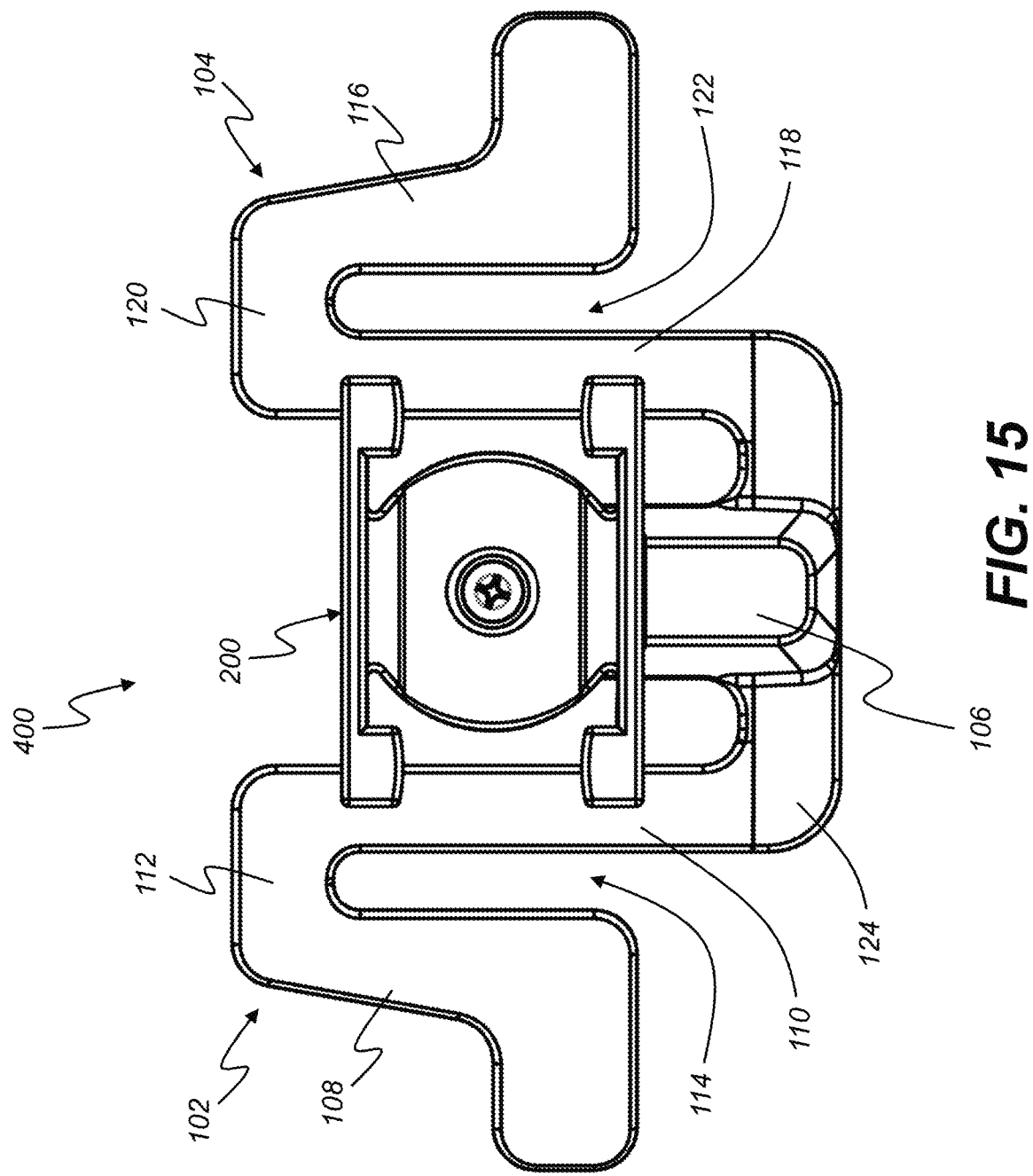
FIG. 15 is a front view of a hat mount according to an embodiment of the presently disclosed subject matter.

In an embodiment, as illustrated in FIG. 15, the hat mount 400 includes the first hanger 102, the second hanger 104, and the middle finger 106. The first hanger 102 includes a first finger 108 and a second finger 110 connected via a first bridge 112. The first and second fingers 108, 110 and the first bridge 112 define a first gap 114. In an embodiment, as illustrated in FIG. 15, the first gap 114 is defined by the first and second fingers 108, 110 and the first bridge 112 to form a generally upside-down U-shaped geometry.

The second hanger 104 includes a third finger 116 and a fourth finger 118 connected via a second bridge 120. The third and fourth fingers 116, 118 and the second bridge 120 define a second gap 122. In an embodiment, as illustrated in FIG. 1, the second gap 122 defines a generally upside-down U-shaped geometry. The second finger 110 is coupled with the middle finger 106 and the fourth finger 118 via a third bridge 124. The first, second, and third bridges 112, 120, 124 are portions of the hat mount 400 which couple one or more other portions of the hat mount 400.

Figures 16, 17:
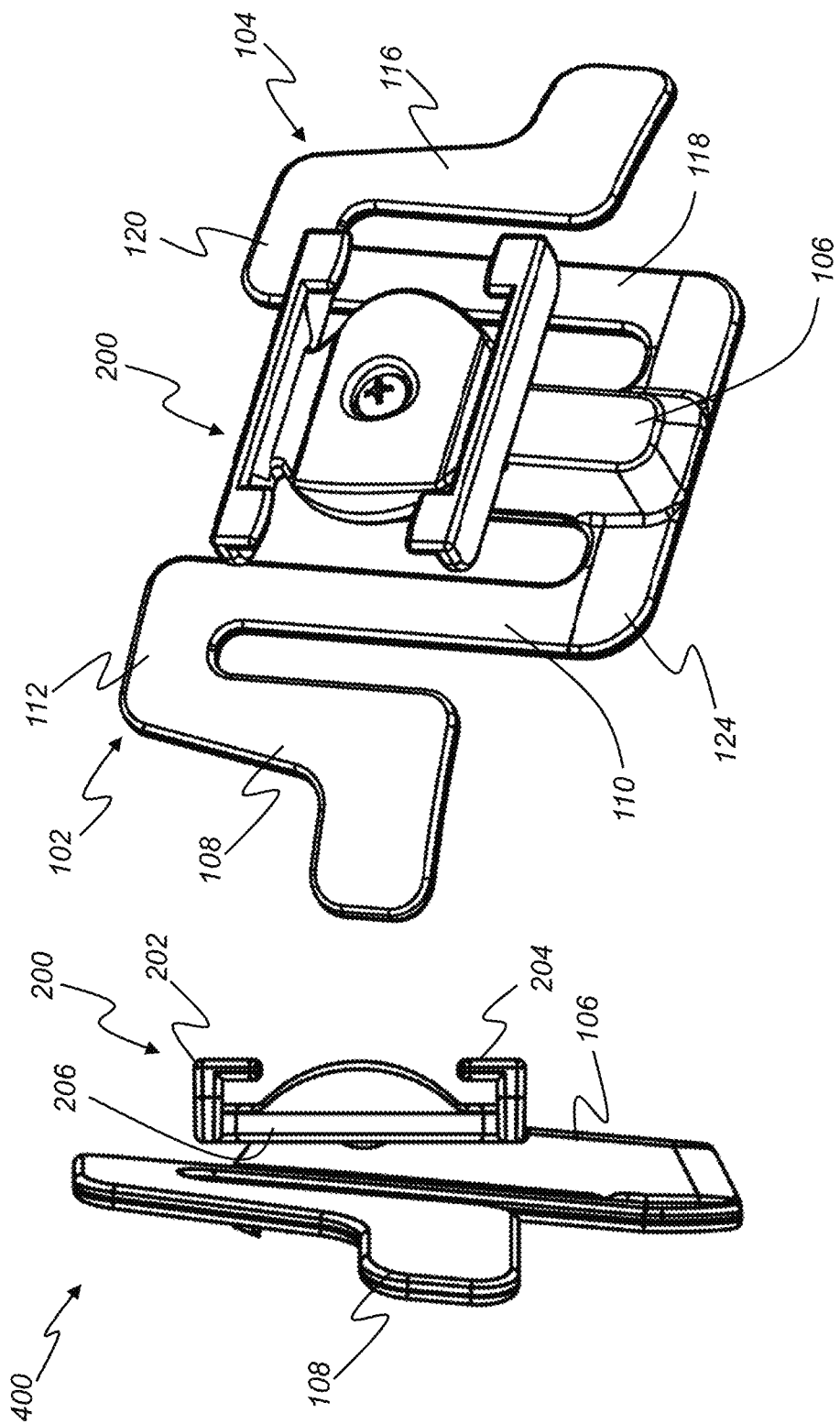
FIG. 16 is a side view of the hat mount according to FIG. 15.
FIG. 17 is a perspective view of the hat mount according to FIG. 15.

In contrast to the hat mount 100, the hat mount 400 locates the instrument mount 200 approximate the distal end of the middle finger 106. In an embodiment, as illustrated in FIGS. 15-17, the middle finger 106 is shorter than the second finger 110 and the fourth finger 118 of the first and second hanger 102, 104. In an embodiment, the hat mount 400 is utilized to couple a hat mounted auxiliary battery 500 with the cap 140. A cable may be utilized to electrically connect the auxiliary battery 500 with the near-eye display device 300.

It is to be understood that the instrument mount 200 may be designed to hold more than one independent instrument at a time. In an embodiment, the instrument mount 200 may be coupled with a first instrument and an independent second instrument simultaneously; for example, the instrument mount 200 may be coupled with a recording device comprising a camera and a separate audio recording device (e.g., microphone) operable separately or together.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An instrument holder for headwear, comprising:
a first hanger;
a second hanger coupled with said first hanger via a bridge portion, wherein said first and second hangers each comprise a first portion extending from said bridge portion in a first direction that is transverse a longitudinal direction of said bridge portion, and a second portion coupled with said first portion and extending in a second direction opposite said first direction, wherein said first and second portions m define a respective gap;
a center finger arranged between said first and second hangers, wherein said center finger extends from said bridge portion in at least said first direction; and
an instrument mount coupled with said center finger;
wherein said first and second hangers are operable to bias relative to said center finger, wherein a portion of a headwear is operable to be positioned between said first and second hangers and said center finger, and wherein at least portion of said headwear is operable to be arranged through said respective gaps.

2. The instrument holder for headwear according to claim 1, further comprising a plate coupled with said center finger and located at least partially below said first and second hangers, wherein said instrument mount is coupled with said plate.

3. The instrument holder for headwear according to claim 2, wherein said plate comprises at least one aperture operable to secure said instrument mount via at least one fastener arranged at least partially therethrough.

4. The instrument holder for headwear according to claim 2, further comprising a cover stop coupled with said plate, wherein said cover stop is operable to prevent rotation of the instrument mount.

5. The instrument holder for headwear according to claim 2, wherein a near-eye display device is operable to connect with said instrument mount, whereby said near-eye display device is operable to be positioned within a field-of-view of said headwear.

6. The instrument holder for headwear according to claim 1, wherein when said headware is positioned between said first and second hangers and said center finger, said center finger is located on an exterior of said headware.

7. The instrument holder for headwear according to claim 1, wherein said first portion of said first and second hangers is operable to bias relative to a second portion of said first and second hangers, whereby said second portion of said first and second hangers is located adjacent to a surface of said sweatband opposite said first portion of said first and second hangers.

8. The instrument holder for headwear according to claim 1, wherein said headware comprises:
a crown having a rim defining a head opening;
a sweatband located at least partially about an interior of said rim; and
a visor coupled with said crown.

9. The instrument holder for headwear according to claim 1, wherein said first second portions are operable to be disposed between a headware sweatband and a headware crown.

10. The instrument holder for headwear according to claim 1, wherein said first and second portions and said center fingers are formed unitary.

11. The instrument holder for headwear according to claim 1, wherein said first portion, said second portion, and said gap of each said first and second hangers define a vertical stop operable to abut a headware sweatband.

12. The instrument holder for headwear according to claim 1, wherein said gap of each said first and second hangers defines a vertical stop operable to abut a headware sweatband.

13. The instrument holder for headwear according to claim 1, wherein at least a portion of said center finger extends in said second direction.

14. The instrument holder for headwear according to claim 1, wherein said instrument mount is coupled with said center finger at or adjacent to a distal end of said center finger opposite said bridge portion.

15. A hat mounting system, comprising:
a hat including a sweatband;
a first hat mount coupled with said hat;
a second hat mount coupled with said hat, wherein said first and second hat mounts each comprise:
a first hanger;
a second hanger coupled with said first hanger via a bridge portion, wherein said first and second hangers each comprise a first portion extending from said bridge portion in a first direction that is transverse a longitudinal direction of said bridge portion, and a second portion coupled with said first portion and extending in a second direction opposite said first direction, wherein said first and second portions each define a respective gap;
a center finger arranged between said first and second hangers; wherein said center finger extends from said bridge portion in at least said first direction; and
an instrument mount coupled with said center finger;
wherein said first and second hangers are operable to bias relative to said center finger, whereby a portion of said hat is operable to be positioned between said first and second hangers and said center finger, and wherein at least portion of said hat is operable to be arranged through said respective gaps.

16. The hat mount system according to claim 15, further comprising a near-eye display device coupled with said first hat mount and an auxiliary battery coupled with said second hat mount.

17. The hat mount system according to claim 15, wherein at least a portion of said center finger extends in said second direction.

* * * * *